US012747339B2

(12) United States Patent
Krupp et al.

(10) Patent No.: US 12,747,339 B2
(45) Date of Patent: Sep. 29, 2026

(54) COMPOSITIONS WITH CARBON NANOTUBES FOR LOW HYSTERESIS ELASTOMERS

(71) Applicant: MOLECULAR REBAR DESIGN, LLC, Houston, TX (US)

(72) Inventors: August Krupp, Austin, TX (US); Clive P. Bosnyak, Dripping Springs, TX (US); Kurt W. Swogger, Austin, TX (US); Vidal Torres, Austin, TX (US); David Parker Cole, Austin, TX (US)

(73) Assignee: MOLECULAR REBAR DESIGN, LLC, Houston, TX (US)

( * ) Notice: Subject to any disclaimer, the term of this patent is extended or adjusted under 35 U.S.C. 154(b) by 641 days.

(21) Appl. No.: 18/132,299

(22) Filed: Apr. 7, 2023

(65) Prior Publication Data

US 2024/0026126 A1 Jan. 25, 2024

Related U.S. Application Data

(60) Provisional application No. 63/328,429, filed on Apr. 7, 2022.

(51) Int. Cl.
*C08K 9/08* (2006.01)
*C01B 32/174* (2017.01)
*C08K 3/36* (2006.01)

(52) U.S. Cl.
CPC .............. *C08K 9/08* (2013.01); *C01B 32/174* (2017.08); *C08K 3/36* (2013.01); *C01B 2202/02* (2013.01); *C01B 2202/06* (2013.01); *C01B 2202/34* (2013.01); *C01P 2004/13* (2013.01); *C01P 2004/64* (2013.01); *C08K 2201/004* (2013.01); *C08K 2201/011* (2013.01)

(58) Field of Classification Search
CPC ...... C08K 9/08; C08K 3/36; C08K 2201/004; C08K 2201/011; C01B 32/174; C01B 2202/02; C01B 2202/06; C01B 2202/34; C01P 2004/13; C01P 2004/64
See application file for complete search history.

(56) References Cited

U.S. PATENT DOCUMENTS

| | | | | |
|---|---|---|---|---|
| 6,783,746 | B1 | 8/2004 | Zhang et al. | |
| 7,601,421 | B2 | 10/2009 | Khabashesku et al. | |
| 7,763,229 | B2 | 7/2010 | Nikolaev et al. | |
| 8,414,792 | B2 | 4/2013 | Rouse | |
| 9,212,273 | B2 | 12/2015 | Bosnyak et al. | |
| 9,353,240 | B2 * | 5/2016 | Bosnyak | C09K 23/002 |
| 9,413,001 | B2 | 8/2016 | Zimrin et al. | |
| 9,433,975 | B2 | 9/2016 | Charkraborty et al. | |
| 2003/0049443 | A1 | 3/2003 | Nishimura et al. | |
| 2007/0298669 | A1 * | 12/2007 | Barrera | C09C 1/565 423/325 |
| 2010/0004468 | A1 | 1/2010 | Wong et al. | |
| 2011/0031443 | A1 | 2/2011 | Park et al. | |
| 2014/0275286 | A1 | 9/2014 | Bosnyak et al. | |
| 2017/0292063 | A1 | 10/2017 | Sturtevant et al. | |
| 2021/0155780 | A1 * | 5/2021 | Dennis-Pelcher | C08K 3/36 |

FOREIGN PATENT DOCUMENTS

| | | | |
|---|---|---|---|
| CN | 1402888 | A | 3/2003 |
| CN | 1803939 | A | 7/2006 |
| KR | 10-2008-0111488 | | 12/2008 |
| KR | 101744125 | B1 | 5/2017 |
| KR | 101914387 | B1 | 10/2018 |
| WO | 200135473 | A1 | 5/2001 |
| WO | 2008054845 | A2 | 5/2008 |
| WO | 2008067137 | A2 | 6/2008 |
| WO | 2011163129 | A2 | 12/2011 |

OTHER PUBLICATIONS

International Search Report and Written Opinion dated Jul. 19, 2023 received in PCT/US2023/17961.
Chaturvedi, Poornendu et al., "Carbon Nanotube-Purification and Sorting Protocols" Defence Science Journal, vol. 58, No. 5, Sep. 2008, pp. 591-599.
Kim, Dong Sik et al., Individualization of Single-walled Carbon Nanotubes: Is the Solvent Important? Small, 2005, 1, No. 11, pp. 1117-1124.
Notification Concerning Transmittal of International Preliminary Report on Patentability from related PCT Application No. PCT/US2023/017961 mailed Aug. 2, 2024.
Peddini S.K. et al., Nanocomposites from styrene-butadiene rubber (SBR) and multiwall carbon nanotubes (MWCNT) part 1: Morphology and rheology, Polymer 55 (2014) pp. 258-270.
Datsyuk V. et al., Chemical oxidation of multiwalled carbon nanotubes, Carbon 46 (2008) pp. 833-840.
Schunk, Andrew, "Molecular Rebar, Goodyear bringing big innovations in nano-packages," Nov. 29, 2022, [From the Internet] RubberNews.com.
Krupp, S. Peddini, "Improved cut, chip and chunk resistance with no sacrifice in rolling resistance or heat build-up in tire compounds," Feb. 2020, RubberWorld, vol. 261, No. 5, 24-28.

(Continued)

*Primary Examiner* — Stuart L Hendrickson

(74) *Attorney, Agent, or Firm* — HUNTON ANDREWS KURTH LLP

(57) ABSTRACT

The present application is directed to novel discrete carbon nanotubes with a surface modification that disperses well in elastomers and crosslinks elastomers to the surface of the discrete carbon nanotubes, or in the vicinity of the discrete carbon nanotube surface. Significant improvements in the performance of elastomeric formulations with a plurality of discrete carbon nanotubes with a surface modification and silica and/or carbon black result, for example, improved abrasion resistance while at the same time providing a reduced hysteresis effect on cyclic deformation. These improved properties are highly desired for fuel efficient and longer wear life tire formulations.

20 Claims, 5 Drawing Sheets

(56) References Cited

OTHER PUBLICATIONS

S. Peddini, A. Krupp, “Improved off-the-road tire formulations with discrete surface functionalized multiwall carbon nanotubes: Correlating wear, abrasion and tear resistance with cut and chip to predict lifetime,” Feb. 2019, RubberWorld, vol. 259 No. 5, 34-39.
Krupp, et al, “Submicron particle generation of multi-wall carbon nanotubes during handling and abrasion testing of reinforced elastomers,” Feb. 2021, RubberWorld, vol. 263, No. 5, 22-27.
Manna et al., “Dynamic Mechanical Properties and Hysteresis Loss of Epoxidized Natural Rubber Chemically Bonded to the Silica Surface,” Journal of Applied Polymer Science, vol. 84, pp. 2171-2177, 2002.
Roben et al., “Investigations into the optimization of Si 363 and Si 266 silane combinations across three differing tire tread formulation types,” Envonik Industries, ITEC in Focus, Sep. 13-14, 2017, 35 pages.
Extended European Search Report dated Mar. 12, 2026, in European Application No. 23785480.7, 14 pages.
Shanmugharaj et al: “Physical and chemical characteristics of multiwalled carbon nanotubes functionalized with aminosilane and its influence on the properties of natural rubber composites”, Composites Science and Technology, Elsevier, Amsterdam, NL, vol. 67, No. 9, Mar. 24, 2007 (Mar. 24, 2007), pp. 1813-1822, XP022000854, ISSN: 0266-3538, DOI: 10.1016/J.COMPSCITECH.2006.10.021.
Sicinski Mariusz et al: “Low-temperature plasma modification of carbon nanofillers for improved performance of advanced rubber composites”, Polymer Bulletin, Springer, Heidelberg, DE, vol. 77, No. 2, Apr. 24, 2019 (Apr. 24, 2019) , pp. 1015-1048, XP036989969, ISSN: 0170-0839, DOI: 10.1007/S00289-019-02785-0 [retrieved on Apr. 24, 2019].
Yeampon Nakaramontri et al: “Effects of in-situ functionalization of carbon nanotubes with bistriethoxysilylpropyl) tetrasulfide (TESPT) and 3-aminopropyltriethoxysilane (APTES) on properties of epoxidized natural rubber-carbon nanotube composites”, Polymer Engineering and Science, Brookfield Center, US, vol. 55, No. 11, Aug. 17, 2015 (Aug. 17, 2015), pp. 2500-2510, XP072669505, Issn: 0032-3888, DOI: 10.1002/PEN.24140.
N. Yan et al: “Carbon nanotubes/carbon black synergistic reinforced natural rubber composites”, Plastics, Rubber and Composites Macromolecular Engineering, vol. 38, No. 7, Oct. 1, 2009 (Oct. 1, 2009), pp. 290-296, XP055520606, GB ISSN: 1465-8011, DOI: 10.1179/146580109X12473409436580.

* cited by examiner

COMPOSITIONS WITH CARBON NANOTUBES FOR LOW HYSTERESIS ELASTOMERS

CROSS REFERENCE TO RELATED APPLICATIONS

This application claims priority to U.S. provisional Application No. 63/328,429 filed Apr. 7, 2022 which application is incorporated herein by reference.

GOVERNMENT SUPPORT

Some portion of this invention may have been made with government support under grant award DE-SC0021823 awarded by U.S. Department of Energy, Office of Science SC-1. The government may have certain rights in the invention.

FIELD OF INVENTION

The present application is directed to novel discrete carbon nanotubes with a surface modification that disperses well in elastomers and also crosslinks elastomers to the surface of the discrete carbon nanotubes, or in the vicinity of the discrete carbon nanotube surface. Unexpected improvements in the performance of elastomeric formulations with a plurality of discrete carbon nanotubes with a surface modification and silica and/or carbon black result in a combination of improved abrasion resistance while at the same time providing a reduced hysteresis effect during cyclic deformation. The combined properties of improved abrasion resistance together with a reduced hysteresis effect is a highly desired feature for fuel efficient and longer life tire tread formulations.

BACKGROUND AND SUMMARY OF THE INVENTION

Tire rolling resistance is the energy lost during a vehicle's tire movement at a consistent speed over a driving surface. The main contributor to rolling resistance in a tire is the process known as hysteresis. Hysteresis is essentially the energy loss that occurs during cyclical movement, such as during deformation events as a tire compresses and elongations during rotation under vehicle load. The energy loss must be overcome by the vehicle's engine or battery, which results in higher energy consumption. A tire tread compound with improved lifetime and better energy efficiency is desired for any vehicle, provided other properties, such as tensile strength and grip under various atmospheric conditions are maintained. These property improvements are especially beneficial for electric vehicles, EVs, because EVs are generally heavier in weight and have a greater torque profile than similar sized conventional internal combustion engine, ICE, vehicles, where the combination of increased weight and torque results in tires wearing more quickly. EVs also stand to gain more from improved tires with better energy efficiency than ICE vehicles because EVs have more efficient drive trains, and therefore, on a fractional basis, lose more energy to rolling resistance in tires. Improving wear resistance in the tire also reduces tire tread wear particle pollution. At present times, many passenger tire tread compounds use a styrene butadiene polymer synthesized in solution, SSBR, and polybutadiene elastomer blend, BR or PBR, with reinforcing silica bound via an organosilane and a small amount of carbon black for coloration and electrostatic dissipation. The silica-based tires have good wet grip and rolling resistance, but lower durability compared to carbon black based tires.

Carbon nanotubes, CNTs, can be classified by the number of walls as single-wall, double wall and multiwall. Each wall of a CNT can be further classified into chiral or non-chiral forms. Some of the carbon atoms of the CNT may be substituted by nitrogen atoms. Some of the walls may contain Stones-Wales defects which are defined as heptagon-pentagon pairs. CNTs are currently manufactured at large tonnage using chemical vapor deposition reactors which produces agglomerated bundles or ropes of carbon nanotubes which have very limited commercial use due to their inferior performance as reinforcing fillers in the agglomerated state. Use of CNTs as a reinforcing agent or filler or conductive filler in polymer composites is an area in which CNTs are predicted to have significant utility if they can be made as discrete carbon nanotubes and homogeneously dispersed within the elastomer matrix.

U.S. Pat. No. 9,212,273 teaches a composition comprising a cured elastomer containing discrete carbon nanotubes, wherein the discrete carbon nanotubes have an aspect ratio of 10 or more, are double wall or multiwall, are present in the range of 0.1 to 30% by weight based on the total weight and are functionalized. Articles made from this composition can be a tire tread or a tire casing. More specifically, carbon nanotube surface modifier or surfactant is chemically or physically (or both) bonded to the elastomer and/or the isolated fibers or the filler in the compounds. An example is provided; oleylamine (1-amino-9-octadecene) can be reacted with carbon nanotubes containing carboxylic groups to give the amide. On addition of the amide modified carbon nanotube to a vinyl containing polymer material such as styrene butadiene followed by addition of crosslinking agents such as peroxides or sulfur, the vinyl containing polymer can be covalently bonded to the amide functionality of the carbon nanotube. Although much improved properties of the filled elastomer compositions, such as tear energy were gained, the gains in rolling resistance were modest, around 2-3% as measured by tan delta values at 30° C. in a dynamic mechanical analyzer, seen in example 8 of U.S. Pat. No. 9,212,273. There remains a need to significantly improve the rolling resistance further.

Hysteresis in filled elastomers has been ascribed to polymer-polymer friction, polymer-filler and filler-filler interactions. Hysteresis in elastomer compounds increases with filler content but the complex nature of the interactions can often give lower or higher hysteresis results with changes to the degree of coupling to the filler. For example, Manna et al. (J. Appl. Polym. Sci. 84: 2171-2177, 2002) demonstrated that high-temperature (180° C.) molding of epoxidized natural rubber (ENR) filled with precipitated silica leads to chemical bond formation between epoxy groups of ENR and silanol groups of silica. The extent of chemical bond formation is further enhanced in the presence of the silane coupling agent. The chemical bond formation between the filler and the polymer should reduce the polymer-filler friction and hysteresis would be expected to decrease. However, hysteresis loss was found to increase with increase in coupling agent loading and strain-dependent dynamic mechanical properties which demonstrates that filler structure can breakdown, which increases with increasing loading of coupling agent. Sulfur-cured systems show higher filler structure breakdown resulting in higher hysteresis than compared to that of non-sulfur systems. Balancing the breakdown of filler structure with silane coupling for hysteretic benefits is a complicated endeavor that relies upon the structure of the filler, the coupling agent providing crosslinking, and the ratio of those compositional elements with relation to one another.

In essence, tiremakers and their raw material suppliers seek lower rolling resistance as a way to boost fuel economy but are constrained by a principle simplified as the "magic triangle of tire technology," which posits that an improvement to rolling resistance has to come at the expense of wet-road grip and durability. A composition that can provide lower rolling resistance, i.e., improved rolling resistance, without expense of wet-road grip and durability is highly desired.

The present invention is directed to a composition comprising a plurality of discrete carbon nanotubes with selected surface functionalization that first disperses well in unsaturated molecules selected from the group of unsaturated monomers, unsaturated oligomers, unsaturated polymers, and any mixtures thereof, where the surface modification under, for example, heat treatment then causes crosslinking of the unsaturated molecules to the surface of the discrete carbon nanotubes, or in the vicinity of the discrete carbon nanotube surface. The extent of crosslinking can be controlled to some extent by the type of surface functionality, concentration of the surface functionality on the discrete carbon nanotube surface, the thermal treatment and the type of unsaturated molecules. Additional quantities or types of crosslinking agents are optionally added to further crosslink unsaturated molecules present.

The types of unsaturated polymers can comprise, for example but not limited to, natural or synthetic elastomers selected from the group consisting of natural rubbers, polybutadiene rubber, solution polymerized styrene-butadiene rubber, bromobutadiene rubber, styrene butadiene rubber, acetonitrile butadiene rubber, polyisoprene rubber, styrene-isoprene rubbers, ethylene propylene diene rubbers, and nitrile rubbers. Additional elastomer types may be blended with the unsaturated polymers such as, but not limited to polyisobutylene, hydrogenated butadiene, and styrene-hydrogenated butadiene. Unsaturated polymers with a glass transition temperature less than about 25° C. are preferred.

Plurality is defined here as meaning the majority based on number of total carbon nanotubes. The discrete carbon nanotubes are selected from the group consisting of single wall, double wall, multiwall carbon nanotubes, and any mixture thereof. The carbon nanotubes can also contain other elements within the walls of the tubes such as nitrogen or boron.

Furthermore, a majority of the discrete carbon nanotubes have a length greater than about 0.2 micrometers. In some cases, the distribution of lengths of the discrete carbon nanotubes can be monomodal, bimodal or multimodal.

The amount of the plurality of discrete single wall carbon nanotubes with surface functionalization present in unsaturated molecules is in the range from about 0.1 to about 3% by weight, preferably from about 0.2 to about 2% by weight, and most preferably from about 0.2% to about 1.5% by weight of the total weight of carbon nanotubes and unsaturated molecules.

The amount of the plurality of discrete double wall carbon nanotubes with surface functionalization present in unsaturated molecules is in the range from about 0.2 to about 6% by weight, preferably from about 0.4 to about 4% by weight, and most preferably from about 0.4% to about 3% by weight of the total weight of carbon nanotubes and unsaturated molecules.

The amount of the plurality of discrete multiwall carbon nanotubes with surface functionalization present in unsaturated molecules is in the range from about 1 to about 30% by weight, preferably from about 2 to about 20% by weight, and most preferably from about 2% to about 15% by weight of the total weight of carbon nanotubes and unsaturated molecules.

The surface functionality is selected from the group of molecules that can crosslink unsaturated molecules, such as, but not limited to, molecules containing sulfur, or azide, or peroxide and mixtures thereof. Preferred molecules that can crosslink molecules are those containing di-sulfur or tetra-sulfur moieties.

At least a portion of the surface functionality is bonded by hydrogen bonding, ionic bonding, or covalent bonding, or a mixture thereof, to the discrete carbon nanotube. Covalent bonding is preferred.

The surface functionality is present at a concentration of at least 0.05 millimoles of surface functionality per gram of discrete carbon nanotubes. A mole is taken to mean the molecular weight of the surface functionality in grams.

The composition comprising a plurality of discrete carbon nanotubes wherein the discrete carbon nanotubes comprise a surface functionalization can further comprise fillers. The fillers are selected from the group consisting of silica, carbon black, oxidized carbon black, graphene, turbostratic graphene, carbon fiber, glass fiber, halloysite, clays, and any mixtures thereof. Silica is preferred.

Silica filler can be present in the range from about 20 to about 55% by weight of the whole composition. The silica is preferred to be treated with a silane coupling agent to improve binding to the elastomer medium.

The modulus of the at least partially crosslinked composition with a plurality of discrete carbon nanotubes and fillers can be controlled by changing the ratio of the plurality of discrete carbon nanotubes to the filler. For example, the modulus can be maintained by increasingly removing amounts of silica present as the amount of the plurality of discrete carbon nanotubes increases.

The plurality of discrete carbon nanotubes with surface functionality can be made by first functionalizing bundles of carbon nanotubes, then using high energy mixing conditions to create the plurality of discrete carbon nanotubes. Alternatively, the discrete carbon nanotubes can be created first, then their surface functionalized. In yet another method, the discrete carbon nanotubes can be surface functionalized in the presence of unsaturated molecules, provided the temperature of the mixing does not cause the surface functionalization to crosslink the unsaturated molecules.

A convenient method to add surface functionalization to the carbon nanotubes is to oxidize the carbon nanotube surface then attach the surface functionalization that can crosslink unsaturated molecules. A preferred method is to oxidize a plurality of discrete carbon nanotubes then utilize silane chemistry to react to the hydroxyl groups present on the oxidized carbon nanotube surface. Silanes comprising disulfide or tetrasulfide moieties are most preferred.

The composition comprising a plurality of discrete carbon nanotubes wherein the discrete carbon nanotubes comprise a surface functionalization can further comprise additives selected from the group consisting of crosslinking agents, plasticizers, processing oils, epoxides, antiozonants, antioxidants and mixtures thereof.

Unexpected improvements in the performance of elastomeric formulations with a plurality of discrete carbon nanotubes with a selected surface modification, silica and/or carbon black result in a highly desired performance combination of improved abrasion resistance while at the same time providing a reduced hysteresis effect. The combined properties of improved abrasion resistance together with a reduced hysteresis effect is a highly desired feature for fuel efficient and longer wear life tire formulations and other applications such as, but not limited to, conveyer belts in mining operations.

DETAILED DESCRIPTION OF THE INVENTION

Figure 1:
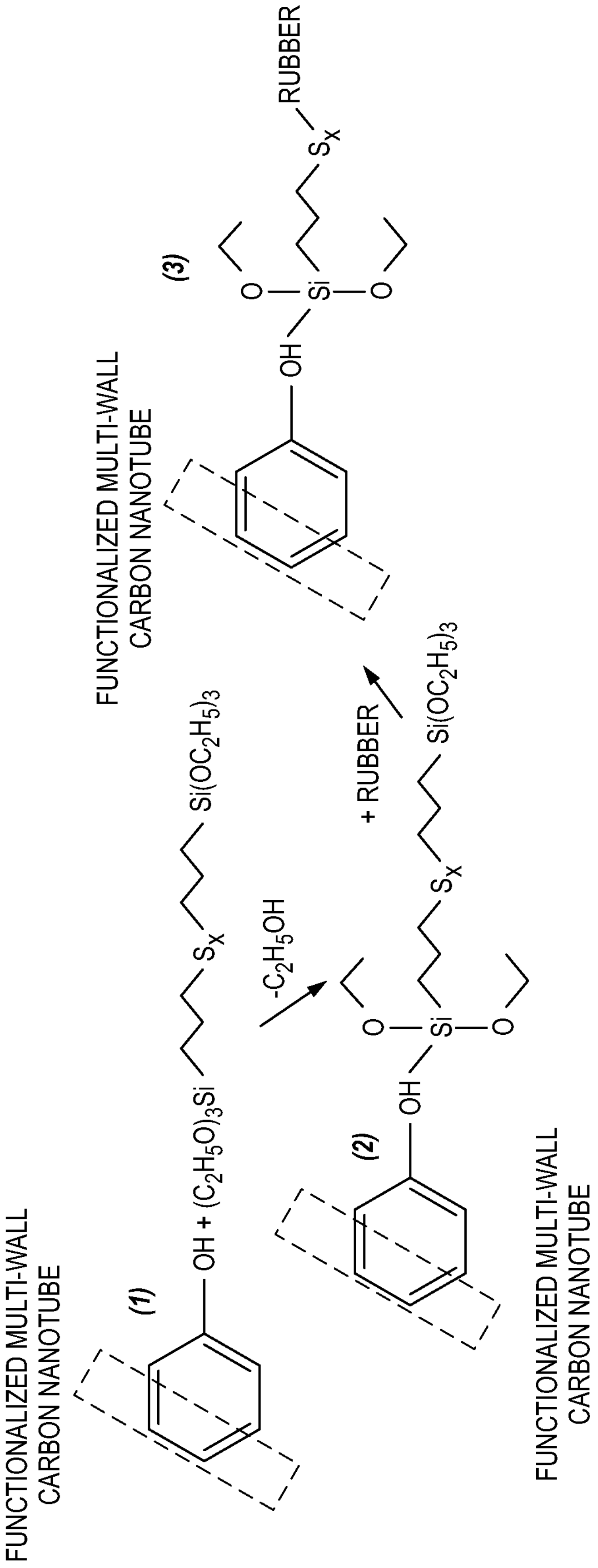
FIG. 1. Stylized depiction of each coupling step in Example 1.

In the following description, certain details are set forth such as specific quantities, sizes, etc., so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

While most of the terms used herein will be recognizable to those of ordinary skill in the art, it should be understood, however, that when not explicitly defined, terms should be interpreted as meaning presently accepted by those of ordinary skill in the art. In cases where the construction of a term would render it meaningless or essentially meaningless, the definition should be taken from Webster's Dictionary, 3rd Edition, 2009. Definitions and/or interpretations should not be incorporated from other patent applications, patents, or publications, related or not. As one of ordinary skill in the nanotube art appreciates since at least about 2010 "plurality" has been used in this art to mean more than any other. That is, a plurality of discrete carbon nanotubes means there is a greater number of nanotubes that are discrete than in, for example, aggregated as bundled or ropes in a representative sample. A plurality of discrete oxidized carbon nanotubes may be wherein an amount of oxidized discrete carbon nanotubes is greater than about 50% based on the total number of all the carbon nanotubes present.

Surface functionalized carbon nanotubes of the present invention generally refer to the chemical modification of the surface of the carbon nanotubes. Such modifications can involve the nanotube ends, sidewalls inside and/or outside, or both. Chemical modifications may include, but are not limited to covalent bonding, ionic bonding, chemisorption, intercalation, surfactant interactions, polymer wrapping, cutting, solvation, and combinations thereof. In some embodiments, the carbon nanotubes may be functionalized before, during and after being individualized or exfoliated. The surface functionalization of this invention is selected to be able to crosslink unsaturated molecules. Unsaturated molecules are taken to be those molecules that contain carbon-carbon double bonds, carbon-carbon triple bonds, and carbon nitrogen triple bonds.

Any of the aspects disclosed in this application with discrete carbon nanotubes may also be modified within the spirit and scope of the disclosure to substitute other tubular nanostructures, including, for example, inorganic or mineral nanotubes. Inorganic or mineral nanotubes include, for example, silicon nanotubes, boron nitride nanotubes and carbon nanotubes having heteroatom substitution in the nanotube structure. The nanotubes may include, or be associated with organic or inorganic elements such as, for example, carbon, silicon, boron and nitrogen. Association may be on the interior or exterior of the inorganic or mineral nanotubes via Van der Waals, ionic or covalent bonding to the nanotube surfaces.

As manufactured carbon nanotubes are obtainable in the form of bundles or entangled agglomerates from different sources, such as CNano Technology, Nanocyl, Arkema, OcSiAl, and Kumho Petrochemical. An acid solution, preferably nitric acid solution at greater than about 60 weight % concentration, more preferably above 65% nitric acid concentration, can be used to reduce undesired catalyst residues, usually containing elements such as, but not limited to, iron, aluminum or cobalt, as well as to oxidize the surface of the carbon nanotubes. Acid or mixed acid systems (e. g. nitric and sulfuric acid) as disclosed in U.S. Pat. No. 9,212,273, the disclosures of which are incorporated herein by reference, can be also used to produce discrete, oxidized carbon nanotubes from as-made bundled, or entangled or roped carbon nanotubes.

As-made carbon nanotubes using metal catalysts such as iron, aluminum or cobalt can retain a significant amount of the catalyst associated or entrapped within the carbon nanotube, as much as about 15 weight percent or more. These residual metals can be deleterious in such applications as electronic devices because of enhanced corrosion, or can interfere with the vulcanization process in curing elastomer composites. Furthermore, these divalent or multivalent metal ions can associate with carboxylic acid groups present on oxidized carbon nanotubes and can interfere with the discretization of the carbon nanotubes in subsequent dispersion processes. The catalyst residues in the as-made carbon nanotubes can be reduced using acids or thermal means. In other embodiments, the carbon nanotubes comprise a residual metal concentration of less than about 25000 parts per million, ppm, and preferably less than about 5000 parts per million. The metals composition and concentration can be conveniently determined using energy dispersive X-ray spectroscopy or thermogravimetric methods.

Carbon nanotubes (CNTs) can be classified by the number of walls as single-wall, double wall and multiwall. Each wall of a CNT can be further classified into chiral or non-chiral forms. Some of the carbon atoms of the CNT may be substituted by nitrogen or boron atoms. Some of the walls may contain Stones-Wales defects which are defined as heptagon-pentagon pairs. CNTs are currently manufactured at large tonnage using chemical vapor deposition reactors which produces agglomerated bundles or ropes of carbon nanotubes which have very limited commercial use due to their inferior performance as reinforcing fillers in the agglomerated state. Use of CNTs as a reinforcing agent or filler, or a thermal or electrically conductive filler in polymer composites is an area in which CNTs are predicted to have significant utility if they can be made as discrete carbon nanotubes. However, utilization of CNTs in these applications has been hampered due to the general inability to reliably produce discrete or individualized CNTs and to homogeneously disperse them in the medium.

In elastomeric compositions with carbon nanotubes and optionally with additional fillers, the desired set of performance improvements such as wear resistance and lower hysteresis require a complexity of material types and structures. Although not bound by theory, it is believed that it is desirable to have a number of structural parameters; a plurality of discrete carbon nanotubes at least above a certain aspect ratio (length to diameter ratio) of about 30, a plurality of discrete carbon nanotubes dispersed within the elastomeric medium without bundling or reforming as agglomerates, a plurality of discrete carbon nanotubes not associated with the fillers such as silica or carbon black and a plurality of discrete carbon nanotubes strongly bound to the elastomer and a layer of the elastomer next to the surface of the discrete carbon nanotube be well-crosslinked.

In this invention it has been discovered that that the desired structural parameters for much improved properties in elastomer compositions can be realized by selecting a carbon nanotube surface functionality that can enable a plurality of discrete carbon nanotubes to be dispersed in non-crosslinked unsaturated molecules without crosslinking the unsaturated molecules, and then the surface functionality is used to promote crosslinking of the unsaturated molecules after the dispersion of the plurality of discrete carbon nanotubes. Furthermore, by employing a plurality of discrete carbon nanotubes crosslinked to the elastomeric medium and having a well-crosslinked layer of the medium next to the surface of the plurality of discrete carbon nanotubes the modulus of the elastic medium can be much enhanced so that less filler is required to maintain the value of the modulus of the elastomer and filler without the plurality of discrete carbon nanotubes. This reduction in the filler content further reduces the hysteresis of the composite because of the overall lower quantity of elastomer polymer-filler interaction and filler-filler interactions.

One other additional feature of this invention, although not bound by this feature, is that the plurality of discrete carbon nanotubes with the surface functionality, when the surface functionality is activated and crosslinking has occurred, provides an interconnected structure at a scale much larger than the crosslink mesh size of the crosslinked elastomer or polymer. The average mesh size of the interconnected structure is related to the average length of the plurality of the discrete carbon nanotubes and inversely related to the amount of the plurality of discrete carbon nanotubes present in the elastomer composition. Further modifications to the nature of the interconnected structure can be made by, for example but not limited to, selecting a plurality of discrete carbon nanotubes of different modality of length, aspect ratio, type of carbon nanotube, amount of surface functionalization, type of surface functionalization, and mixtures thereof. The interconnected structure at a scale larger than the crosslink mesh size of the elastomer provides for the composite to better restrict crack propagation under mechanical strain which leads to improved durability of the elastomer composite.

To provide the performance benefits of being able to obtain a dispersed plurality of discrete carbon nanotubes and also crosslink with unsaturated molecules, bis(3-triethoxysilylpropyl)tetrasulfide, (Si69 Evonic), bis(3-triethoxysilylpropyl)disulfide (Si75 Evonic), and 3-thiocyanatopropyltriethoxysilane (Si264, Evonic) are preferred for coupling to hydroxyl and carboxylic acid groups of oxidized carbon nanotubes. Alternatively, a γ-tert-butylperoxypropyl trimethoxy silane, or an azide sulfonyl silane could be employed.

EV tire treads are wearing at a rate much faster (30%+) than ICE counterparts. This is primarily due to the heavier weight of vehicle, near-instant torque, and urban-oriented driving. This invention addresses this market need and improves tire tread lifetime. Typically, passenger car tires are produced with tread compounds utilizing a blend of solution polymerized styrene-butadiene rubber, SSBR and polybutadiene rubber, BR, with silica bound by silane. Usually, a small amount of carbon black is added to give a black color and provide electrostatic dissipation properties. This tread polymer composite is preferred for improved fuel economy & wet grip and is typically termed a 'Green' compound—referencing the fact that has better fuel economy and less carbon black content than a typical tire. A typical 'Green' tire tread compound can be found in a published article by Roben, et al. (2017), while Evonik provides some graphics relating to the differences between a conventional carbon black filled tire tread and a 'Green' one with high loadings of silica on their website. The formulations provided by Roben, et al. (2017) are used as a basis by the inventors to demonstrate benefits over incumbent technology and prior art in the following examples.

Embodiments of this Invention

Embodiment 1 is a composition comprising a plurality of discrete carbon nanotubes wherein at least a portion of the plurality of discrete carbon nanotubes comprise a surface functionalization that crosslinks molecules selected from the group of unsaturated monomers, unsaturated oligomers, unsaturated polymers, and any mixtures thereof.

Embodiment 2, the composition of embodiment 1, wherein the composition further comprises an unsaturated natural or synthetic elastomer.

Embodiment 3, the composition of embodiment 2, wherein the natural or synthetic elastomer is selected from the group consisting of natural rubbers, polybutadiene, solution polymerized styrene-butadiene rubber, bromobutadiene, styrene butadiene rubber, acetonitrile butadiene, polyisoprene, styrene-isoprene rubbers, ethylene propylene diene rubbers, nitrile rubbers and any mixture thereof.

Embodiment 4, the composition of embodiment 3 wherein the composition further comprises an additional elastomer selected from the group consisting of polyisobutylene, ethylene propylene, hydrogenated butadiene, styrene-hydrogenated butadiene, and any mixture thereof.

Embodiment 5, the composition of embodiment 1 wherein the carbon nanotubes in the plurality of discrete carbon nanotubes are selected from a group consisting of single wall, double wall, multiwall carbon nanotubes, and any mixture thereof.

Embodiment 6, the composition of embodiment 1, wherein a majority of the plurality of discrete carbon nanotubes have a length of greater than about 0.2 micrometers.

Embodiment 7, the composition of embodiment 1, wherein the plurality of discrete carbon nanotubes comprises at least a bimodality of length of the plurality of discrete carbon nanotubes.

Embodiment 8, the composition of embodiment 1, wherein at least a portion of the surface functionalization is covalently attached to the at least a portion of the plurality of discrete carbon nanotubes.

Embodiment 9, the composition of embodiment 1, wherein the surface functionalization is selected from the group of molecules that crosslink unsaturated molecules comprising sulfur, disulfide, tetrasulfide, azide, peroxide moieties, or any mixture thereof.

Embodiment 10, the composition of embodiment 1, wherein the surface functionalization is present at a concentration of at least 0.05 millimoles of surface functionalization per gram of discrete carbon nanotubes in the composition.

Embodiment 11, the composition of embodiment 1, wherein the unsaturated polymers are selected from the group of unsaturated polymers with a glass transition temperature of less than about 25° C.

Embodiment 12, the composition of embodiment 1, wherein the composition further comprises a filler.

Embodiment 13, the composition of embodiment 12, wherein the filler is selected from the group consisting of silica, carbon black, oxidized carbon black, graphene, turbostratic graphene, carbon fiber, glass fiber, halloysite, clays, and any mixture thereof.

Embodiment 14, the composition of embodiment 1, wherein the surface functionalization is selected such that the discrete carbon nanotubes are substantially dispersible in an unsaturated monomer, unsaturated oligomer, unsaturated polymer, or a mixture thereof.

Embodiment 15, the composition of embodiment 1, wherein at least a portion of the plurality of discrete carbon nanotubes and the unsaturated molecules are at least partially crosslinked.

Embodiment 16, the composition of embodiment 1, wherein at least a portion of the plurality of discrete carbon nanotubes are at least partially crosslinked to other discrete carbon nanotubes.

Embodiment 17, the composition of embodiment 2, wherein at least a portion of the amount of discrete single wall carbon nanotubes present in the unsaturated polymer is at least about 0.1 and up to about 3 percent by weight of the total weight of the unsaturated polymer and discrete single wall carbon nanotubes.

Embodiment 18, the composition of embodiment 2, wherein the amount of discrete multiwall carbon nanotubes present in the unsaturated polymer is at least about one and up to about 30 percent by weight of the total weight of the unsaturated polymer and discrete multiwall carbon nanotubes.

Embodiment 19, the composition of embodiment 2, further comprising silica and wherein the silica comprises from about three to about twenty times the total amount of discrete multiwall carbon nanotubes by weight in the composition.

Embodiment 20, the composition of embodiment 19, wherein the composition has a hysteresis value of less than about 95% of a hysteresis value of a comparable composition that lacks the surface functionalization.

Embodiment 21, the composition of embodiment 19, wherein the composition has a value weight loss of particles in a DIN abrasion test which is less than about 95% of a comparable composition that lacks the surface functionalization.

Embodiment 22, the composition of embodiment 19, wherein the composition has an average size of particle lost in a DIN abrasion test which is more than about 1.05 times the average size of particles lost of a comparable composition that lacks the surface functionalization.

Embodiment 23, the composition of embodiment 2, further comprising an additive selected from the group consisting of plasticizers, processing oils, epoxides, antiozonants, antioxidants, and any mixture thereof.

Embodiment 24, the composition of embodiment 8, wherein at least a portion of the surface functionalization is covalently attached to at least a portion of the plurality of discrete carbon nanotube using a silane.

Embodiment 25, a method for making the composition of embodiment 24 wherein the method comprises the steps of: a) first oxidizing the plurality of discrete carbon nanotubes using oxidizing reagents, b) washing the plurality of discrete carbon nanotubes to remove excess oxidizing reagent, c) drying the oxidized plurality of discrete carbon nanotubes, d) redispersing the plurality of discrete carbon nanotubes in an aprotic solvent which dissolves the functional silane molecule to be attached to the surface of the plurality of discrete carbon nanotubes, e) reacting the functional silane molecule to the oxidized carbon nanotube, and f) removing the aprotic solvent.

Embodiment 26, a method for making the composition of embodiment 24 in the presence of unsaturated molecules comprising the steps of: a) first oxidizing the plurality of discrete carbon nanotubes using oxidizing reagents, b) washing the plurality of discrete carbon nanotubes to remove excess oxidizing reagent, c) drying the oxidized plurality of discrete carbon nanotubes, d) adding the dried plurality of oxidized discrete carbon nanotubes to unsaturated molecules e) adding the functional silane molecule to be attached to the surface of the plurality of discrete oxidized carbon nanotubes, f) select conditions of mixing and temperature to obtain a dispersion of the plurality of discrete oxidized carbon nanotubes with attached surface functionality in the presence of unsaturated molecules without crosslinking the unsaturated molecules.

Embodiment 27, the composition of embodiment 1 in the form of a molded or fabricated article.

Embodiment 28, the composition of embodiment 27 wherein the article is a tire, a hose, a belt, a seal or a track.

The following examples are intended to be illustrative of certain embodiments of the present application and are not intended to be limiting in any way.

Acid oxidation of carbon nanotubes has previously been described in U.S. Pat. Nos. 8,475,961, 8,993,161 and 9,065,132, the disclosures of each of which are incorporated herein by reference. Oxidation of carbon nanotubes, CNT, can be done by suspension of the carbon nanotubes in acid at concentrations from 2 to 4% CNT by weight in acid at temperatures around 80-90° C. After oxidation, the acid is removed by means of solid/fluid separation, such as filtration. The amount of acid removed by weight from the mixture of acid and CNT ranges from 60% to 70% by vacuum pump assisted filtration and 80-90% by weight via centrifugation. The residual acid is then removed by washing the oxidized carbon nanotubes with an aqueous medium such as water, preferably deionized water, to a pH of about 3 to 4.

In an alternate process, the concentration of carbon nanotubes in the reaction process is increased. For example, using nitric acid (65% concentration) mixtures of high CNT concentration in the range of 20-50% of CNT by weight in nitric acid has the unexpected consistency of a flowable powder. When the oxidation process is complete, the acid is not removed, but diluted with water and then filtered during the washing process. This eliminates the step of acid filtration for retrieval of acid. The amount of acid wasted in the washing process is significantly less than in the process utilizing much lower concentrations of CNT in the reaction.

The oxidized carbon nanotubes are then suspended in water at a concentration of 0.5% to 4%, preferably 1.5% by weight. The solution is subjected to intensely disruptive forces generated by shear (turbulent) and/or cavitation with process equipment capable of producing energy densities of 106 to 108 Joules/$m^3$. Equipment that meets this specification includes but is not limited to ultrasonicators, cavitators mechanical homogenizers, pressure homogenizers and microfluidizers. After shear and/or cavitation processing, the oxidized carbon nanotubes become oxidized, discrete carbon nanotubes. Typically, based on a given starting amount of entangled as-received and as-made carbon nanotubes, a plurality of discrete oxidized carbon nanotubes results from this process, preferably at least about 60%, more preferably at least about 75%, most preferably at least about 95% and as high as 100%, with the minority of the tubes, usually the vast minority of the tubes remaining entangled, or not fully individualized.

In various embodiments, a plurality of carbon nanotubes is disclosed comprising single wall, double wall or multi wall carbon nanotube fibers having an aspect ratio of from about 10 to about 5000, preferably from about 40 to about 2000, and an overall (total) oxidation level of from about 0.1 weight percent to about 15 weight percent, preferably from about 0.2 weight percent to about 10 weight percent, more preferably from about 0.5 weight percent to about 5 weight percent, more preferably from about 1 weight percent to about 3 weight percent. The oxidation level is defined as the amount by weight of oxygenated species covalently bound to the carbon nanotube divided by the total weight mass of oxygenated nanotubes. The thermogravimetric method for the determination of the percent weight of oxygenated species on the carbon nanotube involves taking about 7-15 mg of the dried oxidized carbon nanotube and heating at 5° C./minute from 100 degrees centigrade to 700 degrees centigrade in a dry nitrogen atmosphere. The percentage weight loss from 200 to 600 degrees centigrade is taken as the percent weight loss of oxygenated species. The oxygenated species can also be quantified using Fourier transform infra-red spectroscopy, FTIR, particularly in the wavelength range 1730-1680 $cm^{-1}$.

The carbon nanotubes can have oxidation species comprising carboxylic acid or derivative carbonyl containing species and are essentially discrete individual nanotubes, not entangled as a mass. Typically, the amount of discrete carbon nanotubes after completing the process of oxidation and shear is a majority (that is, a plurality) and can be as high as 70, 80, 90 or even 99 percent of discrete carbon nanotubes, with the remainder of the tubes still partially entangled in some form. Complete conversion (i.e., 100 percent) of the nanotubes to discrete individualized tubes is most preferred. The derivative carbonyl species can include phenols, ketones, quaternary amines, amides, esters, acyl halogens, carboxylic groups, hydroxyl groups, monovalent metal salts and the like, and can vary between the inner and outer surfaces of the tubes. For example, one type of acid can be used to oxidize the tubes exterior surfaces, followed by water washing and induced shear, thereby breaking and separating the tubes. If desired, the formed discrete tubes, having essentially no interior tube wall oxidation, preferably less than about ½%, more preferably zero. The carbon nanotubes can be further oxidized with a different oxidizing agent, or even the same oxidizing agent as that used for the tubes' exterior wall surfaces at a different concentration, resulting in differing amounts—and/or differing types—of interior and surface oxidation.

In some embodiments, the discrete carbon nanotubes can have about 0.01 Moles/g to about 0.4 mMoles/g tubes carboxylic groups (COOH). The concentration of hydroxyl groups (OH) can be from about 0.01 mMoles/g to about 0.4 mMoles/g and the concentration of lactones can be from about 0.05 mMoles/g to about 0.3 mMoles/g. The total surface area can be from about 150 $m^2/g$ for discrete multiwall carbon nanotubes to about 2000 $m^2/g$ for discrete single wall carbon nanotubes. The density of the discrete tubes can be about 1.5 to about 1.9 $g/cm^2$.

One general method of attaching the surface functionality to carbon nanotubes is to dry the plurality of discrete oxidized carbon nanotubes at 110° C. then disperse them in dry toluene at 1% by weight concentration followed by addition of a silane containing the reactive crosslinking moiety. The mixture is then heated to 90° C. while stirring for an hour, followed by filtering the carbon nanotubes and washing with toluene to remove non-reacted silane containing the reactive crosslinking moiety. A catalytic amount of glacial acetic acid can be added to facilitate the reaction. The plurality of discrete carbon nanotubes with surface functionality is then dried in vacuo at 60° C.

Another general method is to add the plurality of discrete oxidized carbon nanotubes to a mixture of unsaturated molecules, preferably a mixture of styrene-butadiene and polybutadiene, mix in a mixer such as a Banbury mixer to obtain a dispersion of the plurality of discrete oxidized carbon nanotubes, but keeping the temperature of the mix less than that temperature required for the functional group to crosslink the unsaturated molecules. A master batch can be made by this method, which can then be diluted or not as desired.

The composition can further comprise a plasticizer selected from the group consisting of dicarboxylic/tricarboxylic esters, trimellitates, adipates, sebacates, maleates, glycols and polyethers, polymeric plasticizers, bio-based plasticizers, and mixtures thereof. The term "plasticizer" includes both synthetic and natural waxes, and mixtures thereof. An example of a natural wax is carnauba wax. An example of a synthetic wax (sometimes also called a degradative wax) is a very low molecular weight polyethylene polymer trademarked ENGAGE™ and made by The Dow Chemical Company. Very low molecular weight polyethylene waxes have a molecular weight from 300 to 10000, preferably 2000 to 4000. The compositions disclosed herein can comprise at least one of these waxes. The composition can comprise plasticizers comprising a process oil selected from the group consisting of naphthenic oils, paraffin oils, paraben oils, aromatic oils, vegetable oils, seed oils, and mixtures thereof.

The composition can also include antioxidants and antiozonant.

All test plaques of 150 mm×150 mm×2 mm dimensions are pressed using a PHI hydraulic compression press at 150° C. and 45 tons of pressure for t90+2 minutes.

Tensile tests are performed according to ASTM D412-16 using an Instron 3360. The die used to create the tensile specimens is DIN-53504-S2. Five test specimens are produced from each formulation to be tested. When applicable, tear testing is performed using a Die C test according to ASTM D 624.

Dynamic properties of cured slab strips are performed using a TA Instruments DMA Q800. Strain sweep tests are carried out from 0.1% to 30% strain in tension mode (0.01N preload and 1 Hz frequency) at three different temperatures, 0° C., 60° C., and 100° C. The ratio of loss modulus to storage modulus, that is the value of tan δ, is observed at 10% strain for each of these temperatures. Tan δ at 0° C. relates to the wet grip (WG), at 60° C. relates to the rolling resistance (RR), and at 100° C. relates to the heat buildup (HBU) of the elastomer compound. For an improved tread compound relative to a control, the tan δ value at 0° C. should be higher, while the value at 60° C. and 100° C. should be lower. Higher tan δ values at 0° C. correlate to an improved nature of rubber sliding at velocity across micrometer road asperities, while lower tan δ values at 60° C. and 100° C. correlate to lower dynamic hysteresis, i.e., less energy loss during motion, resulting in improved rolling resistance and heat buildup properties, respectively.

Cut and chip resistance of the cured formulations is performed using a Montech CC3000. Formulations are cured into wheels with dimensions of 51 mm diameter×13 mm thick with a 13 mm diameter center hole using time t90+5 minutes for the respective sample. The specimens are rolled at 1080 RPM and the frequency of the impacting blade is set to 30 Hz. Time of the test is 5 minutes. Mass and diameter loss measurements are taken after the test time. Cut and chip resistance is calculated as a reciprocal of volume loss, calculated from the theoretical density and resulting mass loss. Cut & chip testing is used as the preferred method of testing the wear resistance tire tread compounds for off-road tires and truck and bus tires.

Abrasion resistance of the cured formulations is performed using a typical DIN abrasion tester, following Method B of DIN 53516. Formulations are cured into wheels with dimensions of 51 mm diameter×13 mm thick with a 13 mm diameter center hole using time t90+5 minutes for the respective sample, and then the DIN Abrasion specimens of dimensions 16 mm diameter×13 mm thickness are cut from those wheels using a rotating sharp die. Samples are tested following DIN 53516 Method B, where a reference specimen of ISO 4649 B.2 is used to determine reference values for abrasiveness of sheet and associated DIN Resistance Index. All values are calculated in accordance with DIN 53516 Method B.

Transmission electron microscope (TEM) images are taken using a JEOL STEM. Samples are prepared using a Leica cryomicrotome, where the samples are taken below the glass transition temperature to facilitate sectioning to roughly 40 nm in thickness.

The descriptions provided here is for the purpose of teaching the person of ordinary skill in the art how to practice the present application, and it is not intended to detail all those obvious modifications and variations of it which will become apparent to the skilled worker upon reading the description. It is intended, however, that all such obvious modifications and variations be included within the scope of the present application, which is defined by the following claims. The claims are intended to cover the claimed components and steps in any sequence which is effective to meet the objectives there intended, unless the context specifically indicates the contrary.

Example 1

Oxidized and discrete multiwall carbon nanotubes, such as those disclosed in examples from U.S. Pat. No. 10,414,656 (Swogger, et al.), are further functionalized with an organosilane, trade name Si69® from Evonik, where the organosilane has a tetra sulfidic end group and is covalently coupled to the discrete MWCNT. Covalent coupling of the organosilane to the —OH and —COOH groups of the oxidized CNTs occurs at temperatures above 100° C., and most effectively at temperatures above 110° C. in the presence of moisture. This coupling can occur in air, under an inert gas blanket, in a solvent, or in a polymer solution, wet or dry. Once coupled, the now sulfur-functional and discrete MWCNT is then crosslinked via the sulfur end groups (denoted as $S_x$) to the polymer matrix, in this example SSBR. This crosslinking occurs at temperatures above 100° C., and most effectively at temperatures above 120° C., and can occur during mixing or during 'curing' of the rubber composite. The methodology of covalent coupling and resultant chemical structures for each simplified step has been stylized in FIG. 1 for ease of understanding.

Example 2

Example 2 exemplifies the novelty and improvements of this invention. Sulfur-coupled, through an organosilane moiety, discrete multiwall carbon nanotubes, as described in Example 1 above, are utilized in a simplified tire tread formulation and resultant materials properties are compared against formulations without carbon nanotubes or organosilane, without nanotubes but with organosilane, and with prior-art nanotubes but without organosilane (oxidized, but not covalently coupled to anything). The discrete carbon nanotubes have a trade name Molecular Rebar (MR) that is frequently referenced throughout the following examples.

Figure 2:
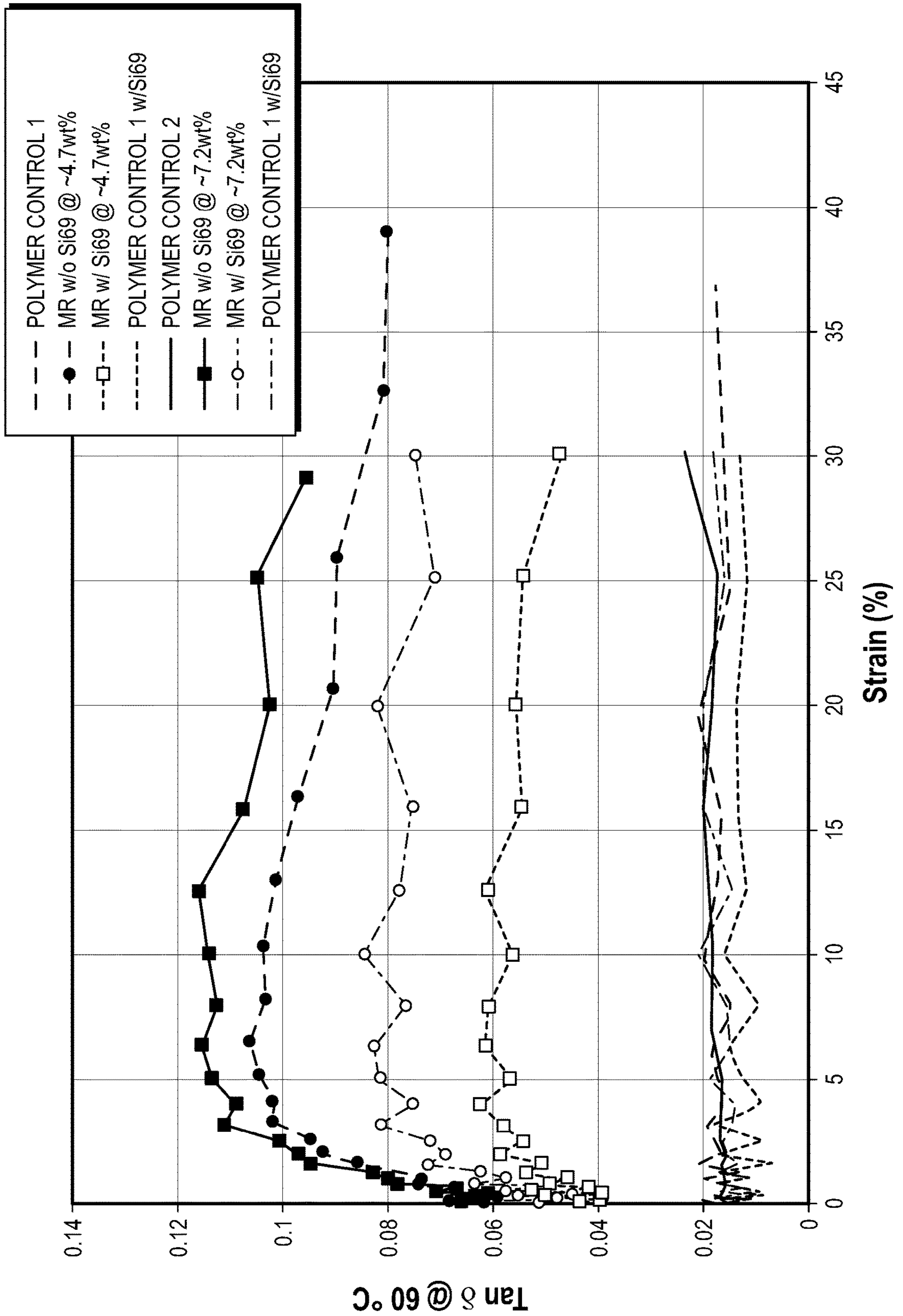
FIG. 2. Plotted values of tan δ at 60° C. from DMA curves of tested samples, demonstrating the decrease at all strains in tan δ values when the silane functional CNTs are coupled with the polymer, as compared to the controls (w/ and w/o Si69) and the oxidized, but not crosslinked, CNTs.

Using a HAAKE Rheomix at ~55 g batch size, a masterbatch (MB) of 10 wt % sulfur-silane-functionalized MR and SSBR is created prior to full mixing. That MB is let-down into a simplified 'Green' tire tread formula (without other fillers to avoid excessive variables) to about 4.7 wt % and to about 7.2 wt % MR in final formulas, respectively. The pure organosilane (Si69®) was also added to the base polymer formulas to identify and prove that the effects of MR+Sulfur through Si69 were truly a combinative effect, rather than a singular effect of the —OH/—COOH (oxidized) MR or the Si69 individually. Oxidized MR, discrete multiwall carbon nanotubes in this case, are an example of prior art as published in U.S. Pat. No. 10,414,656 (Swogger, et al.), without covalently coupled sulfur groups that can crosslink to the surrounding rubber matrix. Two different loadings of CNTs with and without crosslink-able functionalization in this example demonstrate repeatable results. This example provides evidence that the sulfur-coupled and crosslinked discrete CNTs (silane-MR, MR w/Si69, or sulfur-silane-MR) are substantially different than the prior art of oxidized, non-cross linkable discrete MWCNTs, and provide significant benefits over the prior art. The formulas are shown in Table 1 and results are shown in FIG. 2, where the quantity of ingredients is shown as PHR, or parts-per-hundred resin.

TABLE 1

Example 2 formulations produced and tested for material properties.

| Ingredients | Pass Mixed | Polymer Control 1 | MR w/o Si69 @ 4.7 wt % | MR w/ Si69 @ 4.7 wt % | Polymer Control 1 w/Si69 | Polymer Control 2 | MR w/o Si69 @ 7.2 wt % | MR w/ Si69 @ 7.2 wt % | Polymer Control 2 w/Si69 |
|---|---|---|---|---|---|---|---|---|---|
| SSBR 4525-0 | 1 | 100 | 100 | 100 | 100 | 100 | 100 | 100 | 100 |
| Oxidized MR | 1 | | 12 | 12 | | | 12 | 12 | |
| Organosilane (Si69 ®) | 1 | | | 1.44 | 1.44 | | | 1.44 | 1.44 |
| Masterbatch-1$^{st}$ Pass | — | 80 | 89.6 | 90.75 | 81.15 | 80 | 89.6 | 90.75 | 81.15 |

TABLE 1-continued

Example 2 formulations produced and tested for material properties.

| Ingredients | Pass Mixed | Polymer Control 1 | MR w/o Si69 @ 4.7 wt % | MR w/ Si69 @ 4.7 wt % | Polymer Control 1 w/Si69 | Polymer Control 2 | MR w/o Si69 @ 7.2 wt % | MR w/ Si69 @ 7.2 wt % | Polymer Control 2 w/Si69 |
|---|---|---|---|---|---|---|---|---|---|
| BR- Buna CB24 | 2 | 20 | 20 | 20 | 20 | 20 | 20 | 20 | 20 |
| Stearic Acid | 2 | 3 | 3 | 3 | 3 | 3 | 3 | 3 | 3 |
| Vivatec 500 Oil | 2 | 31 | 31 | 31 | 31 | | | | |
| DQ/TMQ | 2 | 2 | 2 | 2 | 2 | | | | |
| 6PPD | 2 | 2 | 2 | 2 | 2 | | | | |
| MC Wax | 2 | 2 | 2 | 2 | 2 | | | | |
| ZnO | 2 | 3 | 3 | 3 | 3 | 3 | 3 | 3 | 3 |
| Sulfur | 2 | 1.7 | 1.7 | 1.7 | 1.7 | 1.7 | 1.7 | 1.7 | 1.7 |
| DPG | 2 | 2 | 2 | 2 | 2 | 2 | 2 | 2 | 2 |
| TBBS | 2 | 1.6 | 1.6 | 1.6 | 1.6 | 1.6 | 1.6 | 1.6 | 1.6 |

Antioxidant DQ by Akrochem is a polymerized, 2,4-trimethyl-1,2-dihydroquinoline-based antioxidant, TMQ is an antioxidant, trimethylquinolium hydroxide. 6PPD N-(1,3-dimethylbutyl)-N'-phenyl-p-phenylenediamine is an antioxidant. DPG is 1,3-diphenylguanidine, an accelerator. TBBS is N-tertiarybutyl-2-benzothiazole sulfenamide, an accelerator.

The samples were tensile tested. It was observed that the addition of Si69 does not meaningfully change the baseline polymer-only tensile properties. The use of oxidized MR alone (no silane functionalization) increases both tensile strength and modulus, demonstrating much improved reinforcement. When the silane is coupled to the MR, and the resultant sulfur groups have been subsequently covalently coupled to the polymer during crosslinking, the tensile strength and modulus are further improved from the same loading of CNTs without the Si69. The combinative effects of MR with coupled sulfur groups through Si69 are superior to the effects of oxidized MR by itself, and the (negligible) effects of the Si69 itself on the baseline polymer system (without CNTs) in both tested formulations of Example 2.

The values of tan δ @ 60° C., a common laboratory measurement performed on a DMA that is the ratio of loss modulus to storage modulus for correlating rolling resistance of tire elastomer composites, are lowered (improved) when the organosilane is covalently coupled to the surface of the plurality of discrete carbon nanotubes. The hysteresis curve in FIG. 2 demonstrates improvements in both filler-filler interaction (low strain) and filler-polymer interaction (high strain), indicating superb covalent coupling of the filler (CNTs/MR) to the polymer matrix (SSBR).

The summarized results of Example 2 are shown in Table 2, where it is demonstrated that the plurality of discrete carbon nanotubes with covalent coupling to the rubber matrix, through organosilane-sulfur groups, improves both the modulus and the rolling resistance indicator of the composite over compositions without carbon nanotubes or with carbon nanotubes that are discrete and oxidized, but not covalently coupled.

TABLE 2

Summarized materials properties of compositions produced and tested in Example 2.

| Material Properties | Polymer Control 1 | MR w/o Si69 @ 4.7 wt % | MR w/ Si69 @ 4.7 wt % | Polymer Control 1 w/Si69 | Polymer Control 2 | MR w/o Si69 @ 7.2 wt % | MR w/Si69 @ 7.2 wt % | Polymer Control 2 w/Si69 |
|---|---|---|---|---|---|---|---|---|
| Tensile Strength (MPa) | 0.8 | 3.1 | 3.8 | 0.9 | 1.1 | 5.4 | 6.0 | 1.5 |
| 100% Modulus (MPa) | 0.7 | 1.8 | 2.2 | 0.8 | 1.2 | 3.9 | 4.2 | — |
| Tan δ @ 60° C. at 10% Strain (unitless ratio) | 0.02143 | 0.1032 | 0.05524 | 0.01588 | 0.02097 | 0.1104 | 0.08423 | 0.02079 |

Example 3

A master batch of organosilane-coupled Molecular Rebar (discrete multiwall carbon nanotubes) is produced as in Example 2, above, on a larger multi-kg scale. The master batch is then mixed in a typical 3 pass mix system with other typical 'Green' tire tread compound ingredients as shown in the formulations in Table 3 using a 1.6 L Banbury. The control compound is a current state-of-the-art EV tire tread compound, and the use of the covalently coupled CNTs in an optimal loading fashion is shown in two different formulas.

TABLE 3

Example 3 formulations produced and tested for material properties.

| Material | Mix Step | Tread Control Compound PHR | 15.5Oil, 13MR, 45Si PHR | 20Oil, 5MR, 60Si PHR |
|---|---|---|---|---|
| SSBR 4525-0 | 1 | | 100 | 100 |
| BR- Buna CB24 | 1 | | | |
| Novel MR | 1 | | 35 | 11.3 |
| Silane Si69 | 1 | | 4.20 | 1.95 |
| Master Batch - 1st Pass | | | 52 | 50 |
| SSBR 4525-0 | 2 | 80 | 41 | 35 |
| BR- Buna CB24 | 2 | 20 | 20 | 20 |
| Ultrasil 7000 GR (Silica) | 2 | 90 | 45 | 60 |
| Silane Si69 | 2 | 7.2 | 3.6 | 4.8 |
| Stearic Acid | 2 | 3 | 3 | 3 |
| Vivatec 500 Oil | 2 | 31 | 15.5 | 20 |
| DQ/TMQ | 2 | 2 | 2 | 2 |
| Antioxidant 6PPD | 2 | 2 | 2 | 2 |
| Microcrystalline Wax (Akrowax 130) | 2 | 2 | 2 | 2 |
| Zinc Oxide | 3 | 3 | 3 | 3 |
| Sulfur | 3 | 1.7 | 1.7 | 1.7 |
| DPG | 3 | 2 | 2 | 2 |
| Accelerator TBBS | 3 | 1.6 | 1.6 | 1.6 |

Figure 3:
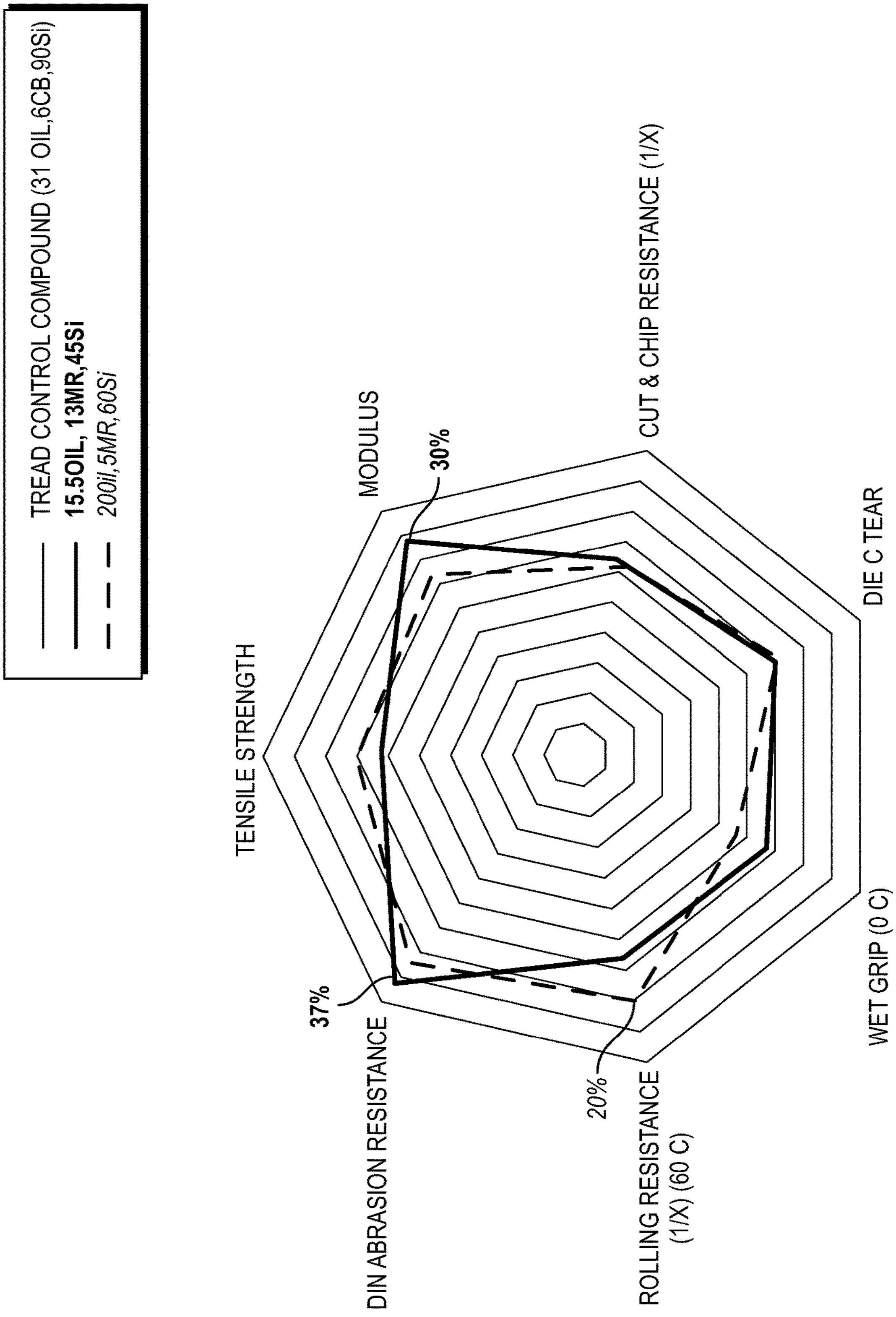
FIG. 3. Summarized material properties of Example 3 elastomer composites for EV tire treads.

The use of covalently coupled Molecular Rebar (discrete CNTs) through an organosilane, with a reduced quantity of oil and silica, resulted in significantly improved properties. The composition properties demonstrated below have optimal properties for two different use-cases in the tire industry. While 20 oil, 5 MR, and 60 silica was a good combination of DIN abrasion resistance of about 26% improvement and rolling resistance improvement of about 20%, it did sacrifice some wet grip properties. On the other hand, the 15.5 oil, 13 MR, 45 silica compound had greatly improved DIN abrasion resistance (+37%), above and beyond anything capable of being produced in using MR without cross linkable functionalization, with no change to rolling resistance or heat build-up. Summarized results of the use of the novel cross linkable MR are shown in FIG. 3.

When used as a replacement for silica, with some adjustment to oil concentration, the functional MR (with silane bonding) provides needed property enhancements, such as improved DIN abrasion resistance and reduced rolling resistance decreases, for 'green' tread compound for electric vehicles. These improvements were made and measured using commercial techniques, indicating that the commercial viability of this functional Molecular Rebar product is high. When dispersed and covalently coupled MR is used in conjunction with a significantly reduced quantity of silica, the lifetime and rolling resistance of a tire tread rubber composite can be improved simultaneously.

Example 4 (Submicron Particle Generation Reduction)

Two similar rubber compounds are produced using standard industry techniques—standard three pass mixing primarily in a 1.6 L tangential mixer (Banbury BR Lab Mixer), followed by sheeting out on a 18" two roll mill (Farrel) per the formulations in Table 1. The compounds are mixed in identical fashion. In the first pass, the elastomers are added first, silane-MR masterbatch for the corresponding sample, followed by the carbon black (if present), silica, silane, and finally, the remaining ingredients—oil, stearic acid, 6PPD, wax, and DQ/TMQ. That material is transferred to the roll mill after reaching 140° C., roughly 4 minutes of mixing under ram pressure. The material is added again to the tangential mixer for the $2^{nd}$ pass, where it is mixed at least 2 minutes above 120° C. to "temper" the material, or to complete the silane coupling with the silica. The material is then transferred to the roll mill. The material is then returned again to the tangential mixer, wherein the curatives (S, DPG, ZnO, TBBS) are added after the rubber has reached a malleable temperature. The compound is mixed until reaching 105° C., or roughly 2 minutes of mix time. The material is then transferred to the two-roll mill and sheeted out into uniform thickness. All materials are listed as parts per hundred (phr) of the total formulation. The formulation is chosen for its relation to in-use state-of-the-art tires for electric vehicles and the MR concentration is the same as previously disclosed in Example 3.

TABLE 4

EV tire formulations compounded for cut & chip submicron particle generation testing in Example 4.

| Formulation Ingredients | Supplier/Grade | Control PHR | Silane-MR PHR |
|---|---|---|---|
| Solution Styrene Butadiene Rubber | SSBR 4525-0/Arlanxeo | 80 | 41 |
| Polybutadiene Rubber | Buna CB 24/Arlanxeo | 20 | 20 |
| Molecular Rebar - Silane Functional in SSBR Masterbatch (25 wt % MR) | Molecular Rebar Design | — | 52 |
| Carbon Black | N234 | 6 | 0 |
| Silica | Ultrasil 7000 GR/Evonik | 90 | 45 |
| Silane | Si69/Evonik | 7.2 | 3.6 |
| Stearic Acid | Stearic Acid RD - Akrochem | 3 | 3 |
| TDAE Oil | Vivatec 500/H&R Group | 31 | 15.5 |
| Antioxidant - 6PPD | PD-2 - Akrochem | 2 | 2 |
| Microcrystalline Wax | Akrowax 130 | 2 | 2 |
| Antioxidant | DQ - Akrochem | 2 | 2 |
| Zinc Oxide | FP-H - Akrochem | 3 | 3 |
| Accelerator | DPG/Akrochem | 2 | 2 |
| Accelerator | TBBS/BBTS/Akrochem | 1.6 | 1.6 |
| Sulfur | Rubbermakers Sulfur/ Akrochem | 1.7 | 1.7 |

A Monsanto R100 single frequency oscillating die rheometer (ODR) is utilized to determine sample rheology and cure kinetics. Pucks are prepared for cut & chip testing using a precision mold: 51 mm Ø×13 mm thick pucks with a 13 mm Ø center hole. The pucks are cured for the t90 time plus 5 minutes with a 150° C. hydraulic hot press using a compression mold, resulting in full crosslink density without reversion. The pucks are tested using a MonTech CC3000 cut & chip tester, operated at 1080 RPM and 30 Hz, with 10 minutes of test time. During testing, a DustTrak II Aerosol Monitor 8530 is used to characterize the particle generation.

The nozzle for the DustTrak is placed above the tested specimen and a cloth filter with measured pore size of ~0.6 mm is installed, reducing large particle intake, reducing risk of efficiency impediment of the 1 μm impactor filter.

Figure 4:
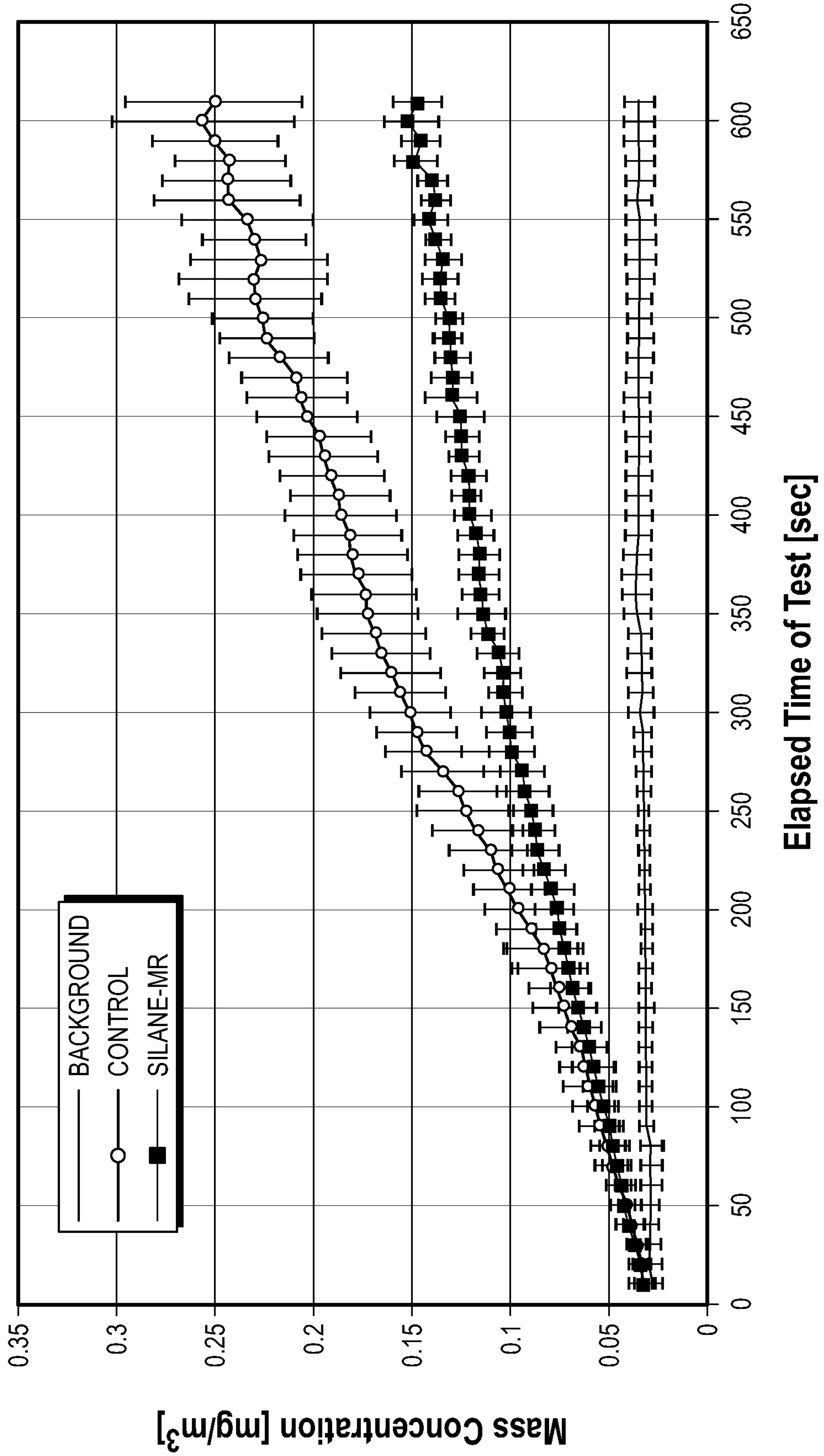
FIG. 4. Analyzed levels of submicron particle generation during cut & chip abrasion.

Five background samples are tested throughout the day, interspersed through sample testing cycles, resulting in an average background concentration of submicron particles that increases slightly as time progresses. This results in an average background concentration of 0.0325 mg/m$^3$ with a standard deviation of 0.0049 mg/m$^3$. The control formulation (sans silane-MR) is tested 8 times over the course of the day, interspersing the testing of a control puck every 2-3 experimental samples. The silane-MR sample is tested 6 times. This testing regimen results in an average standard deviation of ~15% for the control samples, and <10% standard deviation for the silane-MR samples. The results of these tests are analyzed by taking an average of the concentration at each measurement point throughout the 10-minute test time. The standard deviation is also calculated for each point. The overall results are shown in FIG. 4.

It is found that the concentration of submicron particles in the surrounding environment increases as each sample proceeds through the 10-minute testing cycle, as all three of the averaged curves demonstrate an upward linear trajectory. This observation coincides with the hypothesis that the test chamber is not fully evacuated each time the abrading blade contacts the tested puck. In addition, submicron particles would have some airborne residence time, also longer than the time to full evacuation of the chamber. The summation of these events leads to an ever-increasing concentration level of submicron particles in the chamber. The fitted linear slopes and corresponding coefficient of determination are shown in Table 5. It is also found that the increase in submicron particles is linear with respect to time tested. Because the samples were tested back-to-back, and each sample starts at roughly the same initial concentration of submicron particles, it is assumed that the particles are either 1) airborne for a short period of time or 2) vented out of the testing chamber during sample changing.

TABLE 5

Figure 5:
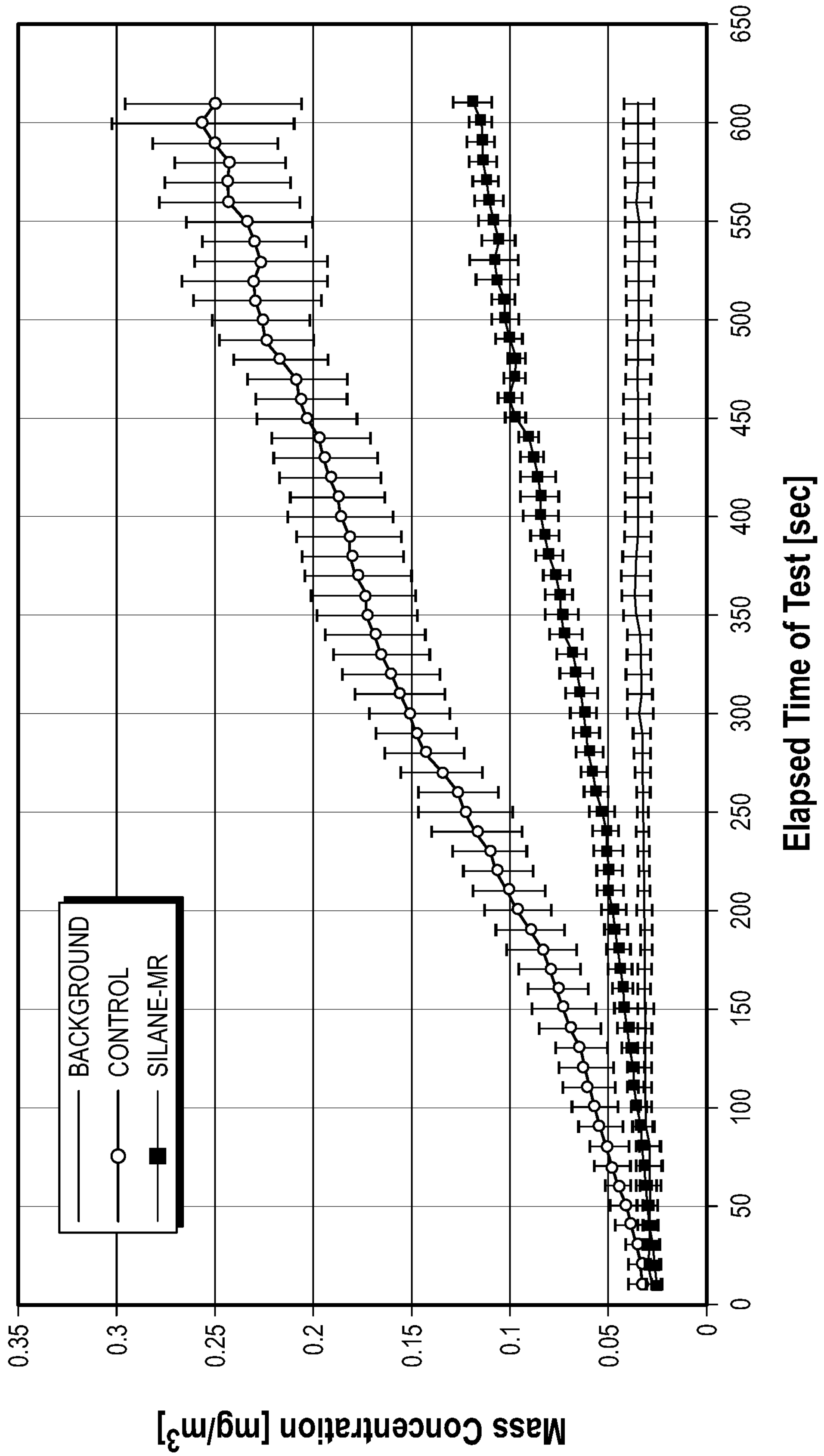
FIG. 5. Analyzed levels of submicron particle generation during cut & chip abrasion.

Linear regression results for each formulation analyzed as reported in FIG. 5.

| | Fitted Slope | $R^2$ |
|---|---|---|
| Control | 0.0004 | 0.991 |
| Silane-MR | 0.0002 | 0.989 |

The control samples have a significantly higher submicron particle generation than the silane-MR sample, by more than 33% on average. The reduction in overall submicron particle generation will likely reduce the treadwear particle generation per mile driven, a reduction in tire-related pollution.

Example 5 (Submicron Particle Size Increase)

The same methods and procedures as outlined in Example 4 above, excepting that the formulation used with the silane-MR is different as appears below in Table 6.

TABLE 6

EV tire formulations compounded for cut & chip submicron particle generation testing.

| Formulation Ingredients | Supplier/Grade | Control PHR | Silane-MR PHR |
|---|---|---|---|
| Solution Styrene Butadiene Rubber | SSBR 4525-0/Arlanxeo | 80 | 53 |
| Polybutadiene Rubber | Buna CB 24/Arlanxeo | 20 | 20 |
| Molecular Rebar - Silane Functional in SSBR Masterbatch (25 wt % MR) | Molecular Rebar Design | — | 36 |
| Carbon Black | N234 | 6 | 0 |
| Silica | Ultrasil 7000 GR/Evonik | 90 | 30 |
| Silane | Si69/Evonik | 7.2 | 2.4 |
| Stearic Acid | Stearic Acid RD - Akrochem | 3 | 3 |
| TDAE Oil | Vivatec 500/H&R Group | 31 | 31 |
| Antioxidant - 6PPD | PD-2 - Akrochem | 2 | 2 |
| Microcrystalline Wax | Akrowax 130 | 2 | 2 |
| Antioxidant | DQ - Akrochem | 2 | 2 |
| Zinc Oxide | FP-H - Akrochem | 3 | 3 |
| Accelerator | DPG/Akrochem | 2 | 2 |
| Accelerator | TBBS/BBTS/Akrochem | 1.6 | 1.6 |
| Sulfur | Rubbermakers Sulfur/ Akrochem | 1.7 | 1.7 |

The overall results for these formulations are shown in FIG. 5.

Example 5 differs from the previous example. The previous example's formulation was demonstrated to simultaneously reduce submicron particle size generation and reduce overall rubber composite mass/volume loss during abrasion testing, by about 25% as compared to the control compound, without silane-MR. This example's formulation does not have significantly reduced overall rubber composite mass/volume loss during abrasion testing. This example's formulation utilizing the silane-MR has nearly equivalent mass/volume loss during abrasion, but still has significantly less submicron particle generation during abrasive events as compared to the control compound. Although the same total mass/volume loss from the compound is equivalent, the overall particle size distribution is skewed to the larger side—resulting in less submicron particle generation and more micron-plus sized particle generation. This reduces potentially harmful submicron environmental contaminants from tire tread wear, even if the total number of contaminants is identical by mass or volume.

We claim:

1. A composition comprising a plurality of discrete carbon nanotubes wherein at least a portion of the plurality of discrete carbon nanotubes comprise a surface functionalization that is linked to molecules of an unsaturated elastomer;

wherein the composition further comprises silica in an amount of from about three to about fifty times the total amount of discrete carbon nanotubes by weight in the composition; and wherein at least a portion of the surface functionalization is covalently attached to at least a portion of the plurality of discrete carbon nanotube using a silane;

wherein the weight ratio of silane to discrete carbon nanotubes is less than about 0.2.

2. The composition of claim 1, wherein the composition has a value weight loss of particles in a DIN abrasion test which is less than about 95% of a comparable composition that lacks the surface functionalization.

3. The composition of claim 1, wherein the unsaturated elastomer is selected from the group consisting of natural rubbers, polybutadiene, solution polymerized styrene-butadiene rubber, bromobutyl rubber, styrene butadiene rubber, acetonitrile butadiene, polyisoprene, styrene-isoprene rubbers, ethylene propylene diene rubbers, nitrile rubbers and any mixture thereof.

4. The composition of claim 3 wherein the composition further comprises an additional elastomer selected from the group consisting of polyisobutylene, ethylene propylene, hydrogenated butadiene, styrene-hydrogenated butadiene, and any mixture thereof.

5. The composition of claim 1 wherein the carbon nanotubes in the plurality of discrete carbon nanotubes are selected from single wall, double wall, multiwall carbon nanotubes, or any mixture thereof.

6. The composition of claim 1, wherein a majority of the plurality of discrete carbon nanotubes have a length of greater than about 0.2 micrometers.

7. The composition of claim 1, wherein the plurality of discrete carbon nanotubes comprises at least a bimodal distribution of length of the plurality of discrete carbon nanotubes.

8. The composition of claim 1, wherein the composition has an average size of particle lost in a DIN abrasion test which is more than about 1.05 times the average size of particles lost of a comparable composition that lacks the surface functionalization.

9. The composition of claim 1, wherein the surface functionalization is selected from the group of silane molecules that link unsaturated molecules comprising sulfur, disulfide, tetrasulfide, or any mixture thereof.

10. The composition of claim 1, wherein the surface functionalization is present at a concentration of at least 0.05 millimoles of surface functionalization per gram of discrete carbon nanotubes in the composition.

11. The composition of claim 1, wherein the unsaturated elastomer has a glass transition temperature of less than about 25° C.

12. The composition of claim 1, wherein the composition further comprises a filler.

13. The composition of claim 12, wherein the filler is selected from the group consisting of carbon black, oxidized carbon black, graphene, turbostratic graphene, carbon fiber, glass fiber, halloysite, clays, and any mixture thereof.

14. The composition of claim 1, wherein the surface functionalization is selected such that the discrete carbon nanotubes are substantially dispersed in an unsaturated elastomer.

15. The composition of claim 1 in the form of a molded or fabricated article.

16. The composition of claim 15 wherein the article is a tire, a hose, a belt, a seal or a track.

17. The composition of claim 1, wherein the discrete carbon nanotubes are primarily single wall and wherein at least a portion of the amount of discrete single wall carbon nanotubes present in the unsaturated elastomer is at least about 0.1 and up to about 3 percent by weight of the total weight of the unsaturated elastomer and discrete single wall carbon nanotubes.

18. The composition of claim 1, wherein the discrete carbon nanotubes are primarily multiwall and wherein the amount of discrete multiwall carbon nanotubes present in the unsaturated elastomer is at least about one and up to about 30 percent by weight of the total weight of the unsaturated elastomer and discrete multiwall carbon nanotubes.

19. The composition of claim 1, further comprising an additive selected from the group consisting of plasticizers, waxes, processing oils, epoxides, antiozonants, antioxidants, and any mixture thereof.

20. The composition of claim 1, wherein the linked composition has a hysteresis value of less than about 95% of a hysteresis value of a comparable composition that lacks the surface functionalization.

* * * * *